(12) United States Patent
Koebel et al.

(10) Patent No.: US 9,096,329 B2
(45) Date of Patent: Aug. 4, 2015

(54) METHOD AND DEVICE FOR DISPLAYING THE PERFORMANCE OF AN AIRCRAFT WHEN CLIMBING AND/OR DESCENDING

(71) Applicant: AIRBUS OPERATIONS (SAS), Toulouse (FR)

(72) Inventors: Thomas Koebel, Toulouse (FR); Boris Kozlow, Toulouse (FR); Maxime Wachenheim, Toulouse (FR)

(73) Assignee: Airbus Operations SAS, Toulouse (FR)

(*) Notice: Subject to any disclaimer, the term of this patent is extended or adjusted under 35 U.S.C. 154(b) by 0 days.

(21) Appl. No.: 14/277,426

(22) Filed: May 14, 2014

(65) Prior Publication Data

US 2014/0343763 A1    Nov. 20, 2014

(30) Foreign Application Priority Data

May 15, 2013 (FR) ...................................... 13 54334

(51) Int. Cl.
| | |
|---|---|
| *G06F 19/00* | (2011.01) |
| *B64D 45/00* | (2006.01) |
| *G01C 23/00* | (2006.01) |
| *G05D 1/06* | (2006.01) |

(52) U.S. Cl.
CPC ................ *B64D 45/00* (2013.01); *G01C 23/00* (2013.01); *G05D 1/0607* (2013.01)

(58) Field of Classification Search
CPC ...... G01C 23/00; G01C 5/005; G05D 1/0676; G08G 5/0086; G08G 5/045

USPC ............................ 701/3, 14, 18; 340/945, 970
See application file for complete search history.

(56) References Cited

U.S. PATENT DOCUMENTS

| | | | |
|---|---|---|---|
| 6,347,263 B1* | 2/2002 | Johnson et al. .................. 701/14 |
| 6,505,102 B2* | 1/2003 | Morizet et al. .................... 701/3 |
| 6,691,004 B2* | 2/2004 | Johnson et al. .................. 701/14 |
| 8,880,245 B2* | 11/2014 | Leberquer et al. ................ 701/3 |
| 2001/0056316 A1* | 12/2001 | Johnson et al. ................. 701/14 |
| 2002/0143439 A1 | 10/2002 | Morizet et al. |
| 2010/0152932 A1* | 6/2010 | Das ................................ 701/14 |
| 2013/0103233 A1* | 4/2013 | Bourret et al. .................. 701/18 |
| 2014/0039731 A1* | 2/2014 | Leberquer et al. ................ 701/3 |
| 2014/0067244 A1* | 3/2014 | Baker et al. ................... 701/120 |

FOREIGN PATENT DOCUMENTS

EP     1 245 929     10/2002

OTHER PUBLICATIONS

Search Report for FR 1354334 dated Feb. 13, 2014.

* cited by examiner

*Primary Examiner* — McDieunel Marc
(74) *Attorney, Agent, or Firm* — Nixon & Vanderhye P.C.

(57) ABSTRACT

A method and device for displaying the performance of an aircraft when climbing and/or descending. The device includes devices for data capture, calculation and generating images for a display screen. The calculation device is configured to calculate a maximum slope that the aircraft can adopt depending on current data received from a data capture device. A display device presents images of the maximum slope superimposed with altitudes of a projected flight plan.

13 Claims, 2 Drawing Sheets

METHOD AND DEVICE FOR DISPLAYING THE PERFORMANCE OF AN AIRCRAFT WHEN CLIMBING AND/OR DESCENDING

This application claims priority to French Patent Application No. 1354334 filed 15 May 2013, the entire contents of each of which are hereby incorporated by reference.

BACKGROUND OF INVENTION

The present invention relates to a method and a device for displaying the performance of an aircraft when climbing and/or descending, and also to an aircraft comprising this type of display device.

It is known that on present aircraft, when a change of flight level (climb or descent) is necessary during a flight, pilots can initiate the change of altitude manually. To do this, they select the required altitude and set a specific mode in a flight control unit (FCU). There is therefore an open descent mode to cause the aircraft to descend and an open climb mode to cause the aircraft to climb.

When one of these modes is set, the vertical slope taken by the aircraft corresponds to the maximum slope that the aircraft is capable of adopting. This maximum slope depends on the capability of the aircraft at the time the mode is applied. Parameters such as the mass and speed of the aircraft, and the engine thrust are factors that determine its ability to follow a slope.

However, pilots do not know exactly what slope the aircraft will take or the positions through which it will pass to reach the selected altitude. This is because no device exists that has been designed to calculate and provide this information to the crew.

SUMMARY OF INVENTION

The object of the present invention is to overcome this drawback, and it relates to a method and a device for displaying the performance of an aircraft when climbing and/or descending.

According to the invention, said method is noteworthy it comprises the following successive steps, implemented automatically and repetitively, and consisting of:
receiving current flight data;
calculating at least one maximum slope that the aircraft can adopt depending on said current data and its performance; and
providing a constant display of a flight path with said maximum slope on at least a portion of a display screen, which is configured to display a vertical flight plan.

Therefore, with the help of the invention, pilots have constant access to the flight path with the maximum slope at which the aircraft is capable of flying, depending on the current conditions, in other words an image of the flight path that the aircraft will follow if one of the above-mentioned modes (open climb or open descent) is applied. As indicated above, these modes cause the aircraft to fly at its maximum slope. The maximum slope is calculated from the current flight data, which gives an accurate and reliable result. The maximum slope is displayed on a vertical display (VD) screen (or a screen portion) of the flight plan, which shows the characteristics of the vertical flight plan of the aircraft.

According to different embodiments of the invention, which can be taken together or separately:
the maximum slope calculated is a climb slope for said aircraft;
the maximum slope calculated is a descent slope for said aircraft;
to calculate said maximum slope, the method consists of solving the following differential equations of thrust:

$$m\frac{dV}{dt}\cos\gamma = T\cos(\alpha+\gamma) - \frac{1}{2}\rho V^2 S(C_x\cos\gamma + C_z\sin\gamma);$$

$$m\frac{dV}{dt}\sin\gamma = T\sin(\alpha+\gamma) - mg - \frac{1}{2}\rho V^2 S(C_x\sin\gamma + C_z\cos\gamma);$$

where:
T is the maximum thrust in open climb mode or the minimum thrust in open descent mode respectively, with the assumption that one engine is switched off,
V is the aircraft speed,
$\rho$ is the air density, which depends on the altitude,
S is a reference area of the aircraft wings,
m is the aircraft mass,
Cx is the drag coefficient,
Cz is the lift coefficient,
$\alpha$ is the angle of attack of the aircraft, and
$\gamma$ is the slope of the aircraft.
Furthermore, advantageously:
said slope is displayed on request (in particular by the pilot) on said screen portion; and
said slope is displayed automatically on said screen portion.

It will be noted that the constant display of the flight path applies from the moment the display is actuated (either manually (in particular by a pilot), or automatically (for a particular flight phase, for example)).

The invention also relates to a device for displaying the performance of an aircraft when climbing and/or descending, comprising data capture means, calculation means and a display screen.

According to the invention, this device is noteworthy in that said calculation means are configured to calculate at least one maximum slope that the aircraft can adopt depending on the data received from the data capture means, and in that said device is also configured to display said calculated maximum slope on at least a portion of the display screen, which is configured to display a vertical flight plan.

Moreover, advantageously, said calculation means are capable of calculate a climb slope and/or a descent slope for said aircraft.

The invention also relates to an aircraft comprising a device of this type for displaying the performance of an aircraft when climbing and/or descending.

SUMMARY OF THE FIGURES

The figures of the appended drawings will make clear how the invention can be achieved. In these figures, identical references numerals designate similar elements.

DETAILED DESCRIPTION

Figure 1:
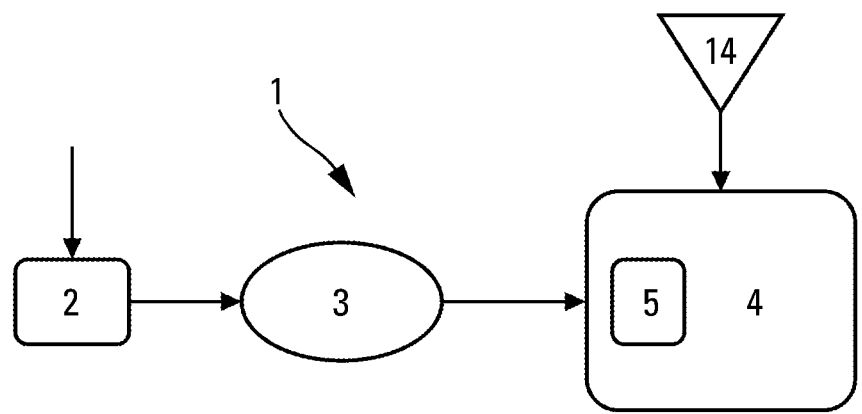
FIG. 1 is a block diagram of a performance display device for an aircraft when climbing and/or descending, which illustrates the invention.

In FIG. 1, the performance display device 1 of an aircraft when climbing and/or descending, comprises data capture means 2, calculation means 3 and a display screen 4. Said display device 1 also comprises means 14 enabling a pilot to adjust the display produced on the display screen 4. The data capture means 2 receive, measure and/or determine current flight data and structural data for the aircraft. The current flight data are in particular the aircraft speed V, the air density ρ, the aircraft mass m, the flight plan, the angle of attack α, and the wind speed and direction. The aircraft structural data are the maximum thrust T when climbing or when descending with an engine switched off, the reference area S of the wing, the drag coefficient Cx, the lift coefficient Cz, and the mathematical relationship α(γ) between −+
the angle of attack and slope of the aircraft. All these parameters are transmitted automatically to the calculation means 3.

Said calculation means 3 are configured to calculate at least one maximum slope 7, 8 that the aircraft can adopt. The maximum slope 7, 8 calculated may be a climb slope 7 or a descent slope 8.

Figure 3:
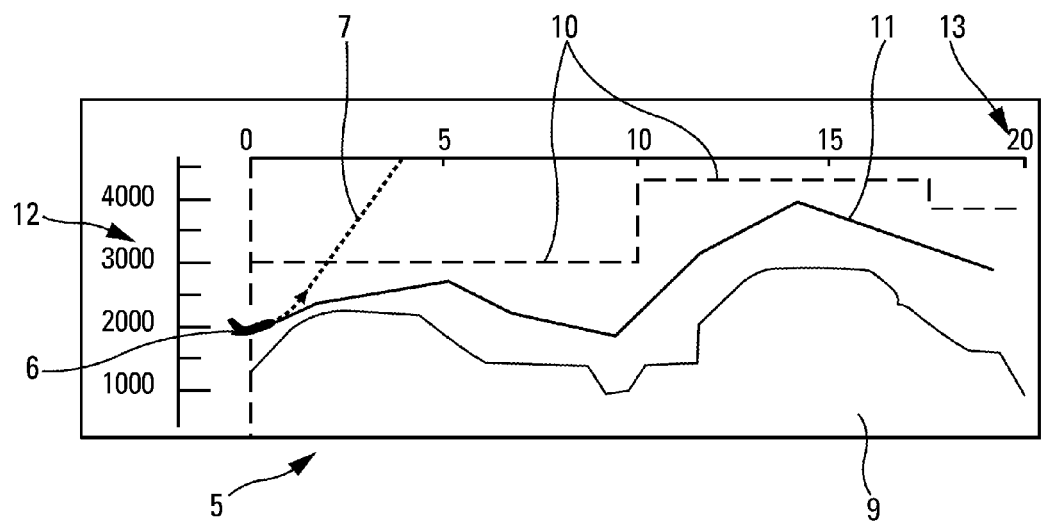
FIG. 3 shows diagrammatically an example of the use of the device according to an embodiment of the invention for a low altitude flight.
Figure 4:
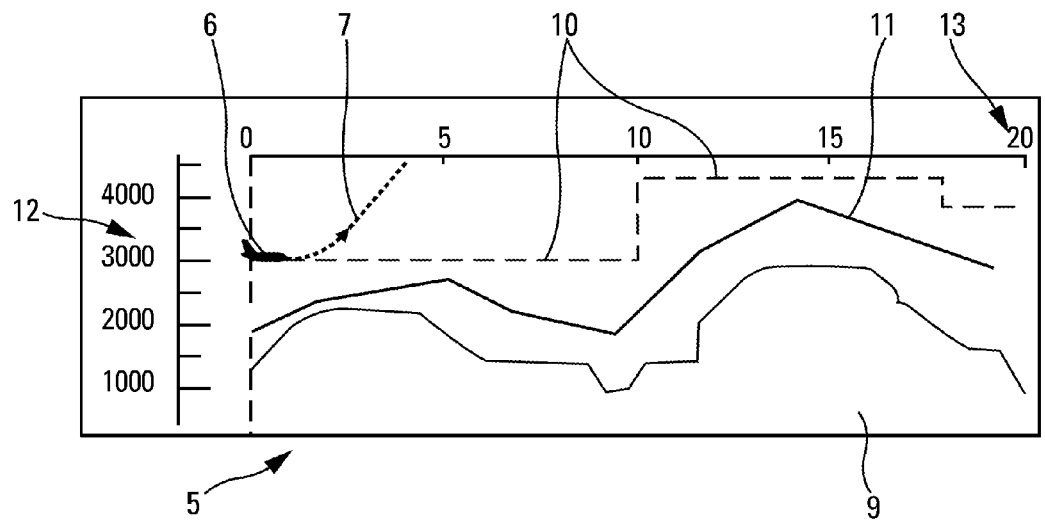
FIG. 4 shows diagrammatically another example of the use of the device for a high altitude flight.

Said device 1 is also configured to allow the maximum slope 7, 8 to be displayed on at least a portion 5 of a display screen 4. This screen 4 (or at least this screen portion 5) is usually configured to display the vertical flight plan of the aircraft, as shown in FIGS. 3 and 4. This conventional illustration of a VD display usually shows a symbol 6 indicating the aircraft, the relief 9, the flight path 11 of the aircraft at low altitude, and safe altitudes 10. A vertical scale 12 shows the altitude in feet, and a horizontal scale 13 shows the distance to be covered in nautical miles.

Thus, with the help of the invention, after actuating the display, the pilots have constant access to the flight path with the maximum slope 7, 8 at which the aircraft is capable of flying depending on the current conditions, in other words an image of the flight path that the aircraft will follow if one of the normal modes (open climb or open descent) is applied, these modes causing the aircraft to fly at its maximum slope 7, 8. The maximum slope 7, 8 is calculated from current flight data to obtain an accurate and reliable result.

This device 1 can also help pilots in particular situations so that they know when the aircraft should change altitude. For example, for a low altitude flight the aircraft may have to change altitude, depending on the ground relief. The flight path display has the advantage of ensuring that the pilot does not have to anticipate or delay the procedure to achieve a particular safe distance in relation to the relief.

Figure 2:
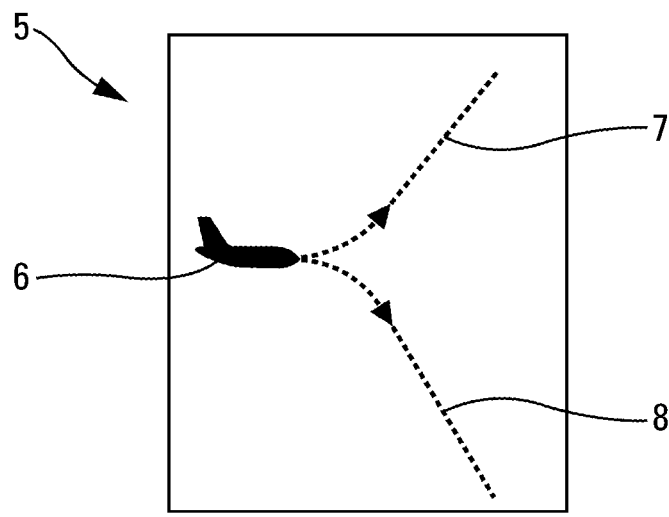
FIG. 2 is a diagrammatic representation which is displayed on a screen portion.

Said slope or slopes 7, 8 are therefore displayed on said portion 5 of the screen 4, as illustrated in FIG. 2. The image shows an aircraft 6, with two dashed lines symbolising the maximum slopes 7 and 8. A first maximum slope 7 indicates the performance of the aircraft 6 as it climbs, and a second maximum slope 8 indicates the performance of the aircraft 6 as it descends, for climb and descent procedures respectively.

The image is displayed automatically or on request. In the first case, the image of the slope or slopes 7, 8 appears constantly on the screen 4 throughout the journey of the aircraft, or when the aircraft attains particular conditions. The slopes 7, 8 are calculated continuously so that they are adjusted to successive flight conditions. Pilots are therefore always able to see updated slopes 7, 8. In the second case the image appears when the pilots need it, by means of display control means, such as a button, which may form part of the means 14.

Pilots are therefore informed of the capacity of the aircraft 6 to climb or descend because the maximum slopes 7, 8 are calculated and displayed. They can therefore choose in particular the appropriate moment to select a climb or descent mode.

The slope 7, 8 is calculated from the data supplied by the data capture means 2.

To calculate said maximum slope 7, 8 the calculation means 3 solve the following differential equations of thrust:

$$m\frac{dV}{dt}\cos\gamma = T\cos(\alpha+\gamma) - \frac{1}{2}\rho V^2 S(C_x\cos\gamma + C_z\sin\gamma);$$

$$m\frac{dV}{dt}\sin\gamma = T\sin(\alpha+\gamma) - mg - \frac{1}{2}\rho V^2 S(C_x\sin\gamma + C_z\cos\gamma);$$

where:
T is the maximum thrust in open climb mode or the minimum thrust in open descent mode respectively with the assumption that one engine is switched off,
V is the aircraft speed,
ρ is the air density, which depends on the altitude,
S is a reference area of the aircraft wings,
m is the aircraft mass,
Cx is the drag coefficient,
Cz is the lift coefficient,
α is the angle of attack of the aircraft, and
γ is the slope of the aircraft, in other words the angle between the velocity vector and the horizon.

The angle of attack α is defined between the direction plane of the airflow which circulates round the aircraft wings and the orientation of the plane formed by the wings (more precisely the reference cord of the wing). The mathematical relationship α($_\gamma$) is an item of structural data associated with the aircraft type.

Thus, for α≠0, the data capture means supply the calculation means 3 with the mathematical relationship α($_\gamma$) connecting the angle of attack α and the slope $_\gamma$.

In a simplified calculation mode, the slope 7, 8 is calculated in two parts. The curve part is calculated on the assumption that the acceleration of the aircraft is not zero, and that the variation in angle of the slope $_\gamma$ compensates for the variation in speed due to thrust that increases when climbing or decreases when descending. The asymptotic part of the curve, on the other hand, is calculated on the assumption that, firstly, acceleration is zero and, secondly, that α is zero. In this case, the following thrust $_T$ and slope $_\gamma$ equations are obtained from the earlier equations:

$$T = \frac{1}{2}\rho SV^2 C_x + mg\sin\gamma;$$

$$\gamma = \sin^{-1}\left[\frac{1}{mg\left(T - \frac{1}{2}\rho SV^2 C_x\right)}\right].$$

This device 1 is particularly useful for a mission carried out during a low altitude flight. As shown in FIG. 3, a flight plan for a low altitude flight comprises, in addition to the flight path 11 to be followed, a succession of flight levels 10 arranged above the flight path 11, which are known as safe altitudes. These safe altitudes are safe levels at which the aircraft can be positioned at a distance from the ground relief to avoid any risk of collision. However, these safe altitudes enable a reasonable distance from the ground relief to be maintained so that if need be low altitude flight can be resumed easily.

The maximum climb slope 7 shows pilots what flight path the aircraft will follow to reach the corresponding safe altitude if the open climb mode is engaged. Thus, they can react in the most appropriate way in relation to unforeseen obstacles or problems on the ground, using the calculation and display of the potential climb flight path of the aircraft.

Once the safe altitude 10 is reached, the crew can analyse the causes that produced the climb and choose either to return to low altitude or climb higher to a minimum flight altitude or alternatively remain at the safe altitude.

In another embodiment shown in FIG. 4, the aircraft maintains a flight path that corresponds to the safe levels 10. Whenever the safe level 10 changes, the aircraft must make the corresponding changes in altitude to move from one safe level to the next.

Using the maximum slope 7, 8 display, the device 1 gives pilots the advantage of knowing when they should begin the climb in order to reach the next safe level without the risk of passing below the next safe level when that level is higher than the previous one or to avoid reaching it too soon.

In the embodiments in FIGS. 3 and 4, display of the maximum descent slope 8 is not necessary. In the first example, the aircraft can only climb higher as it is flying at low altitude. In the second example, it is sufficient to wait for the aircraft to cover the distance corresponding to the length of the previous level in its entirety, before descending to the next level.

The advantage of displaying a maximum descent slope 8 becomes apparent, for example, when the aircraft 6 must adhere to a maximum altitude which changes during the journey. When changing flight level, pilots must begin the descent at the appropriate time, firstly in order to avoid passing above the next level if that level is lower than the previous level and second to avoid descending too soon.

The invention claimed is:

1. A method for displaying the performance of an aircraft when climbing and/or descending, the method comprising
   receiving current flight data;
   calculating flight control unit (FCU) at least one maximum slope that the aircraft can adopt depending on said current flight data and current structural data associated with the aircraft;
   generating an image depicting altitudes of a projected flight path for the aircraft;
   generating an image of said maximum slope; and
   presenting on a display device the image depicting altitudes of the projected flight path and the image of the maximum slope, wherein the image of the maximum slope is superimposed with the image depicting altitudes.

2. The method according to claim 1, wherein the maximum slope calculated is a climb slope for said aircraft.

3. The method according to claim 1, wherein the maximum slope is a descent slope for said aircraft.

4. The method according to claim 1, wherein to calculate said maximum slope, the method consists of solving the following differential equations of thrust:

$$m\frac{dV}{dt}\cos\gamma = T\cos(\alpha + \gamma) - \frac{1}{2}\rho V^2 S(C_x\cos\gamma + C_z\sin\gamma);$$

$$m\frac{dV}{dt}\sin\gamma = T\sin(\alpha + \gamma) - mg - \frac{1}{2}\rho V^2 S(C_x\sin\gamma + C_z\cos\gamma);$$

where:
T is the maximum thrust in open climb mode or the minimum thrust in open descent mode respectively with the assumption that one engine is switched off,
V is the aircraft speed,
$\rho$ is the air density, which depends on the altitude,
S is a reference area of the aircraft wings,
m is the aircraft mass,
Cx is the drag coefficient,
Cz is the lift coefficient,
$\alpha$ is the angle of attack of the aircraft, and
$\gamma$ is the slope of the aircraft.

5. The method according to claim 1, wherein said maximum slope is displayed in response to a request.

6. The method according to claim 1, wherein said maximum slope is displayed automatically.

7. A device configured to display information related to a flight of an aircraft, wherein the device is within the aircraft and comprises:
   a data capture device configured to capture current information regarding the aircraft and the flight path of the aircraft;
   a calculation device
   receiving the captured current information from the data capture device, and the calculation device is configured to calculate at least one maximum slope for the aircraft and the calculation is made using the captured current information, and
   a display device is also configured to constantly display said calculated maximum slope and altitudes of a flight plan of the aircraft.

8. The device according to claim 7, wherein said at least one maximum slope includes a climb slope for said aircraft.

9. The device according to claim 7, wherein said at least one maximum slope includes a descent slope for said aircraft.

10. The device according to claim 7 wherein the data capture device captures information including: aircraft speed, density of air in which aircraft is flying, mass of the aircraft, angle of attach if the aircraft, and wind speed and wind direction.

11. A method to display information regarding a flight path of an aircraft including:
    collecting current flight data of the flight of the aircraft;
    calculating control unit (FCU) a maximum flight slope that the aircraft using the current flight data and current structural data of the aircraft;
    generating an image depicting altitudes of a projected flight path for the aircraft, wherein the image depicts a current altitude of the aircraft;
    generating an image representing the maximum flight slope; and
    displaying by a display device the image depicting altitudes of the projected flight path and the image representing the maximum flight slope, wherein the image representing the maximum flight slope is superimposed with the image depicting altitudes.

12. The method of claim 11 wherein the displaying includes displaying the image representing the maximum flight slope at a current position portion of the image depicting altitudes, wherein the current position portion represents a current altitude of the aircraft.

13. The method of claim 11 further comprising displaying on the display device an image representing a safe altitude for the aircraft at a plurality of locations along the projected flight path, and displaying on the display device representing elevations of the ground below the projected flight path.

* * * * *